July 21, 1925.  1,546,654

F. GUSTAFSON

WEEDING ATTACHMENT FOR LISTERS AND THE LIKE

Filed Jan. 15, 1921

F. Gustafson, Inventor

Patented July 21, 1925.

1,546,654

UNITED STATES PATENT OFFICE.

FRED GUSTAFSON, OF IDAHO FALLS, IDAHO.

WEEDING ATTACHMENT FOR LISTERS AND THE LIKE.

Application filed January 15, 1921. Serial No. 437,569.

*To all whom it may concern:*

Be it known that I, FRED GUSTAFSON, a citizen of the United States, residing at Idaho Falls, in the county of Bonneville and State of Idaho, have invented a new and useful Weeding Attachment for Listers and the like, of which the following is a specification.

This invention relates to a weeding and mulching attachment for listers, cultivators and the like, one of its objects being to provide a simple structure of this character which can be applied readily to the beam of the cultivator and adjusted to cut under the soil at any desired distance from the surface, thus to sever the roots of the weeds in the path thereof and also break up the surface of the soil to produce a fine mulch.

Another object is to provide an attachment of this character having diverging blades adapted to travel between rows and which is adjustable in width to adapt it to different distances between the rows.

A still further object is to provide an attachment which, when connected to a lister or cultivator will operate to cut the roots of weeds and break up the surface soil, the said attachment working up closer to the roots of the potatoes, corn or other vegetation being cultivated, than is possible where only a lister is used for such purpose.

It is well known that in irrigated districts after irrigation the soil will crust or harden around the potatoes, corn or other vegetation and by mounting this attachment in front of the lister blade it will not only destroy weeds and roots close to the roots of the vegetation under cultivation but will also break up the crust and pulverize it, allowing the soil to retain its moisture much longer than would otherwise be possible.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1:
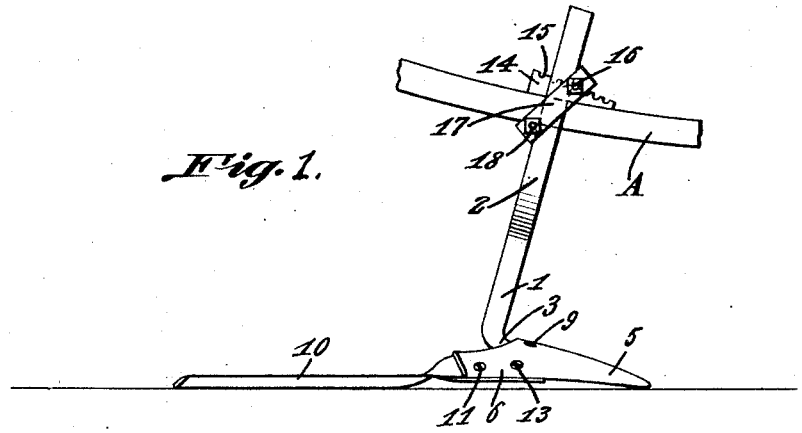
Figure 1 is a side elevation of the attachment and a portion of the beam of a lister.

Referring to the figures by characters of reference 1 designates a standard the upper end portion of which is forked as indicated at 2 so as to straddle the beam A of the lister. The lower portion of the standard 1 is extended forwardly as at 3 to provide a tongue 4 which extends under the middle portion of a pointed steering blade 5 having rearwardly diverging wings 6, the advancing edges of the blade 5 and its wings 6 being sharpened and the upper surface of the said blade and wings being preferably convex as shown. The tongue 4 is attached to the blade 5 by a bolt 7 and by a cross strip 8 which is secured to the bottom of the blade 5 by bolts 9. Pivotally connected to each of the wings 6 is the forward end portion of a blade 10, the same being attached to the wing by a bolt 11. A transverse slot 12 is formed in each of the blades 10 and receives a fastening bolt 13 extending from the wing. Obviously by loosening the bolts 13 the blades 10 can be adjusted angularly toward and from each other, thus to vary the sweep of the attachment.

Figure 2:
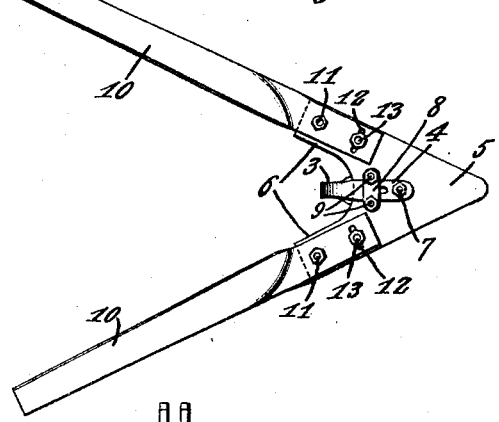
Figure 2 is a bottom plan view of the attachment.
Figure 3:
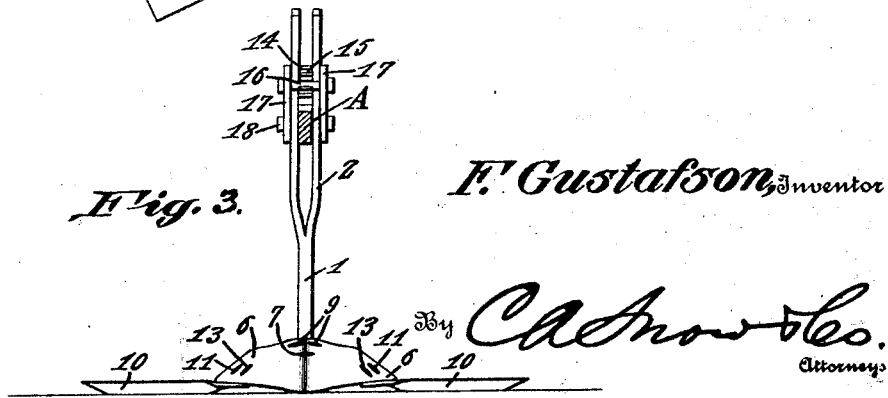
Figure 3 is a front elevation, the lister beam being shown in section.

In order that the blades 10 may properly work under the surface of the soil, they are given a slight twist adjacent their forward ends so that the cutting portions of the blades will be properly positioned while the front end portions will lie at the proper angle under the wings 6, as shown particularly in Figure 2.

As before stated the forked upper end of the standard 1 straddles the beam A. A wedge-shaped block 14 is mounted on the beam A and is provided with a series of transverse notches 15. Anyone of these notches is adapted to receive a bolt 16 extending across the block and in front of the upper portion of the standard 1, the bolt 16 connecting clamping plates 17 engaging the sides of the beam A and which plates are connected at their lower ends by a bolt 18 extending back of the standard 1. Obviously by tightening the bolts 16 and 18 the forked portion 2 of the standard will be clamped tightly upon the beam A and as the upper bolt 16 is seated in one of the notches 15 the standard will be held properly in the position to which it has been adjusted.

It will be apparent that when the device herein described is attached to a beam in front of a lister or the like and is properly adjusted it will travel at a predetermined distance under the surface of the soil, cutting the roots in the path thereof and loosening the crust of the soil so as to reduce it to a powder. The blades 10 will work up close to the rows of vegetation being cultivated and as these blades are adjustably mounted, they can be arranged so as to work properly between rows at different distances apart.

What is claimed is:—

1. A weeding and mulching attachment for listers comprising a substantially L-shaped standard, the long arm of which is disposed upright and faced edgewise with the beam of a lister, the lower short arm being in the form of a flat foot with an aperture at its free end, a pointed shovel blade detachably connected with said foot, said blade being convexo-concave and provided with diverging wings, the advancing edges of the blade and its wings being sharpened and their upper faces made convex, twisted blades pivotally connected at their front ends to said wings and having means for holding them in adjusted position, and adapted to be moved angularly to lower them from each other to vary the sweep of the attachment, and means for connecting the standard to the lister beam.

2. A weeding and mulching attachment for listers comprising a substantially L-shaped standard adapted to face edgewise, the lower arm of the standard being extended forwardly and flattened to form an attaching foot, said foot having an aperture, a pointed shovel blade having rearwardly diverging wings with the edges of the blade and its wings sharpened and the upper surface thereof convexed, said foot being extended under said blade with its free end bolted to the blade, a cross strip spanning said foot and secured to the blade in rear of said bolt, flat blades having their front ends slightly twisted to adapt them to fit flat against the under face of the wings of the shovel blade, said flat blades having transversely extending slots in their free ends to receive a fastening bolt and adapt said blades to be adjusted angularly toward and away from each other for varying the sweep of the attachment, the wings of the shovel blade having transversely extending slots and bolts extending through the slots in the wings of the shovel blade to secure the flat blades in adjusted position against pivoting and means, for adjustably connecting the standard with a lister beam.

In testimony that I claim the foregoing as my own, I have hereto affixed my signature in the presence of two witnesses.

FRED GUSTAFSON.

Witnesses:
W. H. HOLDEN,
F. A. WISHART.